United States Patent
Zhan

(10) Patent No.: US 8,345,154 B2
(45) Date of Patent: Jan. 1, 2013

(54) ACCESSORY CONNECTING SHELF FOR VIDEO AND CAMERA

(76) Inventor: Xiaohong Zhan, Fujian (CN)

( * ) Notice: Subject to any disclaimer, the term of this patent is extended or adjusted under 35 U.S.C. 154(b) by 0 days.

(21) Appl. No.: 13/259,150

(22) PCT Filed: Aug. 7, 2009

(86) PCT No.: PCT/CN2009/073144
§ 371 (c)(1),
(2), (4) Date: Sep. 23, 2011

(87) PCT Pub. No.: WO2011/014993
PCT Pub. Date: Feb. 10, 2011

(65) Prior Publication Data
US 2012/0013791 A1    Jan. 19, 2012

(51) Int. Cl.
*H04N 5/225* (2006.01)
(52) U.S. Cl. ........................ 348/375; 348/373
(58) Field of Classification Search .................. 396/419, 396/422, 424, 428, 429; D16/200, 208, 214; 348/373, 375, 207.99
See application file for complete search history.

(56) References Cited

U.S. PATENT DOCUMENTS

| | | | | |
|---|---|---|---|---|
| 3,731,897 A | * | 5/1973 | Price | 248/230.1 |
| 4,255,036 A | * | 3/1981 | Pincetich | 396/422 |
| D302,697 S | * | 8/1989 | Parrish | D16/242 |
| 6,042,277 A | * | 3/2000 | Errington | 396/419 |

FOREIGN PATENT DOCUMENTS

JP    51-006723    * 1/1976

* cited by examiner

*Primary Examiner* — Tuan Ho
*Assistant Examiner* — Chan Nguyen
(74) *Attorney, Agent, or Firm* — Leong C. Lei

(57) ABSTRACT

An accessory connecting shelf for video and camera includes a horizontal orientated connecting plate (1) having double-step connecting pieces. A screwed connecting through hole (3) is provided in the higher connecting piece (2) at the inside end of the connecting plate for connecting a video and camera apparatus, and a chute (5) is provided in the lower connecting fpiece (4) at its outside end. An arc support (6) is connected to the chute, wherein the lower end of the arc support is connected with the lower connecting piece by a connecting screw (7) passing through the chute, and the upper end of the arc support is provided with an arc chute (9). Hot shoe holders (10) are provided within the arc chute for connecting accessories. The present invention not only enables several hot shoe holders to be installed simultaneously to connect several accessories, but also can flexibly adjust various orientations to meet the requirements of different shooting angles.

1 Claim, 4 Drawing Sheets

ACCESSORY CONNECTING SHELF FOR VIDEO AND CAMERA

BACKGROUND OF THE INVENTION a) Field of the Invention

The present invention relates to an accessory connecting shelf for video and camera.

b) Background of the Invention

Currently, in order to achieve certain effects or realize some functions, a commonly used small-size video or camera needs to be installed with some accessories when videos or pictures are being taken, such as flash, video light, microphone, and the like. In order to install such accessories, nowadays, the commonly used tool is a flat-plate connecting shelf. However, only one accessory can be installed on the flat-plate connecting shelf once, and moreover the directional angle of the accessory cannot be changed, rendering the use thereof inconvenient. Generally, a viewfinder of a small-size home video camera can be folded and placed on a side of the video camera, so it may hamper the opening of the viewfinder and in turn influence normal usage of the video camera if the flat-plate connecting shelf is used for installing the accessory.

SUMMARY OF THE INVENTION

An object of the present invention is to provide an accessory connecting shelf for video and camera, which solves the problem that a plurality of accessories commonly used cannot be installed on a small-size video or camera. The accessory connecting shelf for video and camera according to the present invention not only can flexibly adjust various orientations, but also can be installed with a plurality of hot shoe holders simultaneously to connect with a plurality of accessories, thereby meeting the requirements of taking pictures or making videos from different shooting angles.

The technical solution according to the present invention is as follows: an accessory connecting shelf for video and camera comprises a horizontal orientated connecting plate having double-step connecting pieces, wherein a screwed connecting through hole for connection of a video and camera apparatus is provided at a higher connecting piece at an inside end of the connecting plate, and a chute is provided at a lower connecting piece at an outside end of the connecting plate; an arc support is connected to the chute, and a lower end of the arc support is connected with the lower connecting piece by means of a connecting screw passing through the chute and a screwed through hole at a lower end thereof; an arc chute is provided at an upper side of the arc support, and hot shoe holders for connecting with accessories and locking screws for fastening the hot shoe holders are provided within the arc chute.

The present invention has the following advantages: according to users' different usage requirements, different accessories for video and camera can be installed on the accessory connecting shelf, and the locations and angles of the accessories for video and camera can be adjusted by adjusting the locations of the arc support or hot shoe holders; besides, a plurality of accessories can be used simultaneously to meet users' requirements for making videos or interviews.

DETAILED DESCRIPTION OF THE INVENTION

Figure 1:
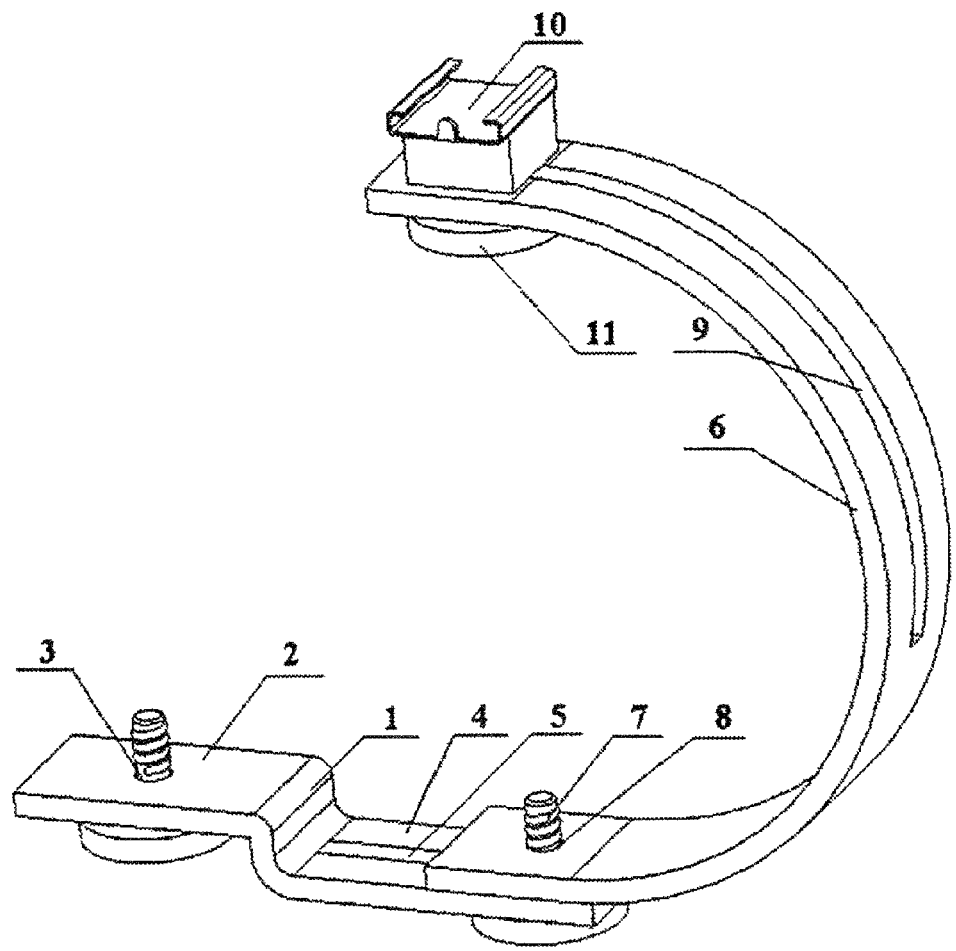
FIG. 1 is a structural schematic view according to the present invention.
Figure 2:
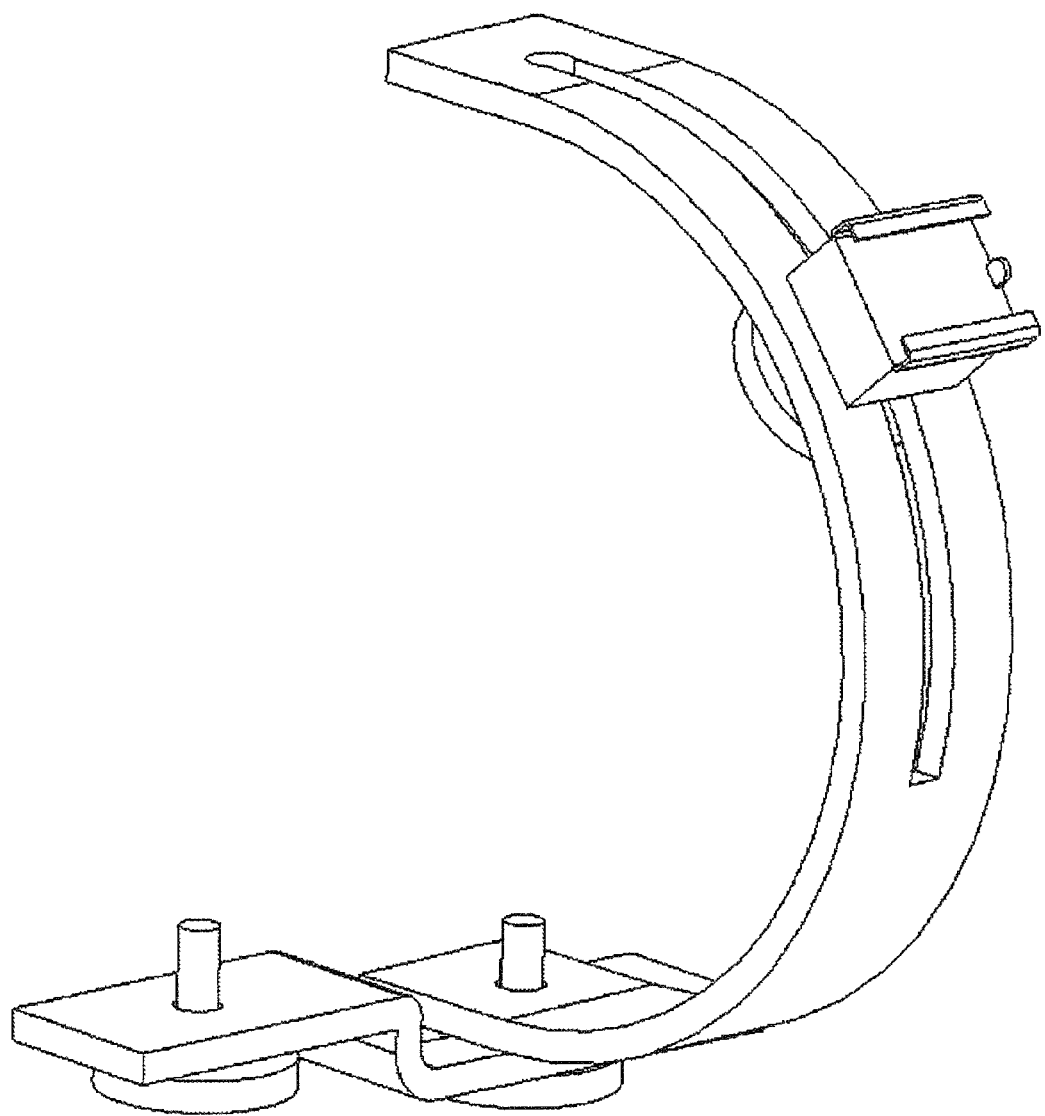
FIG. 2 is a schematic view of a certain working status according to the present invention.
Figure 3:
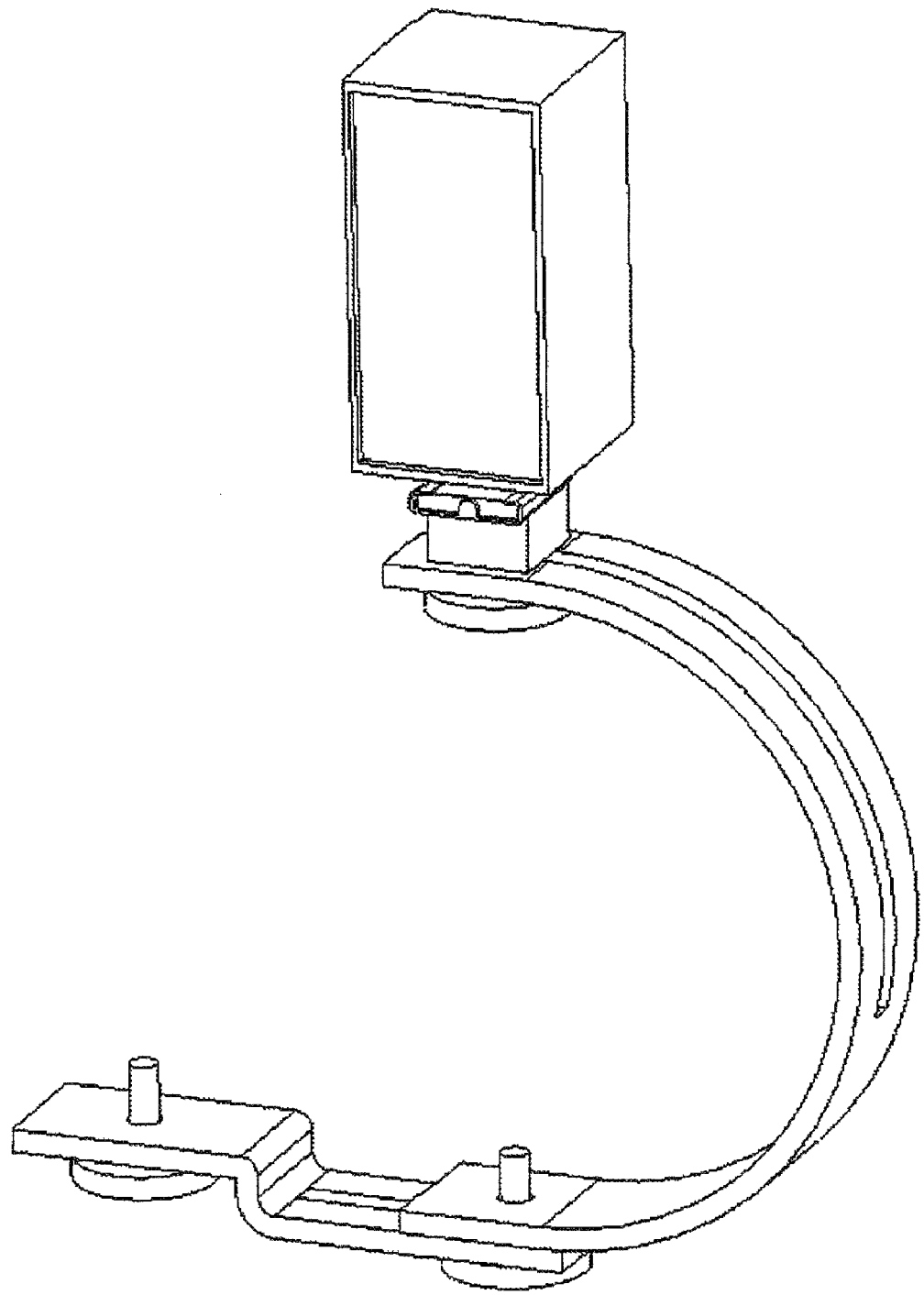
FIG. 3 is a schematic view of a working status according to the present invention when working together with an accessory.
Figure 4:
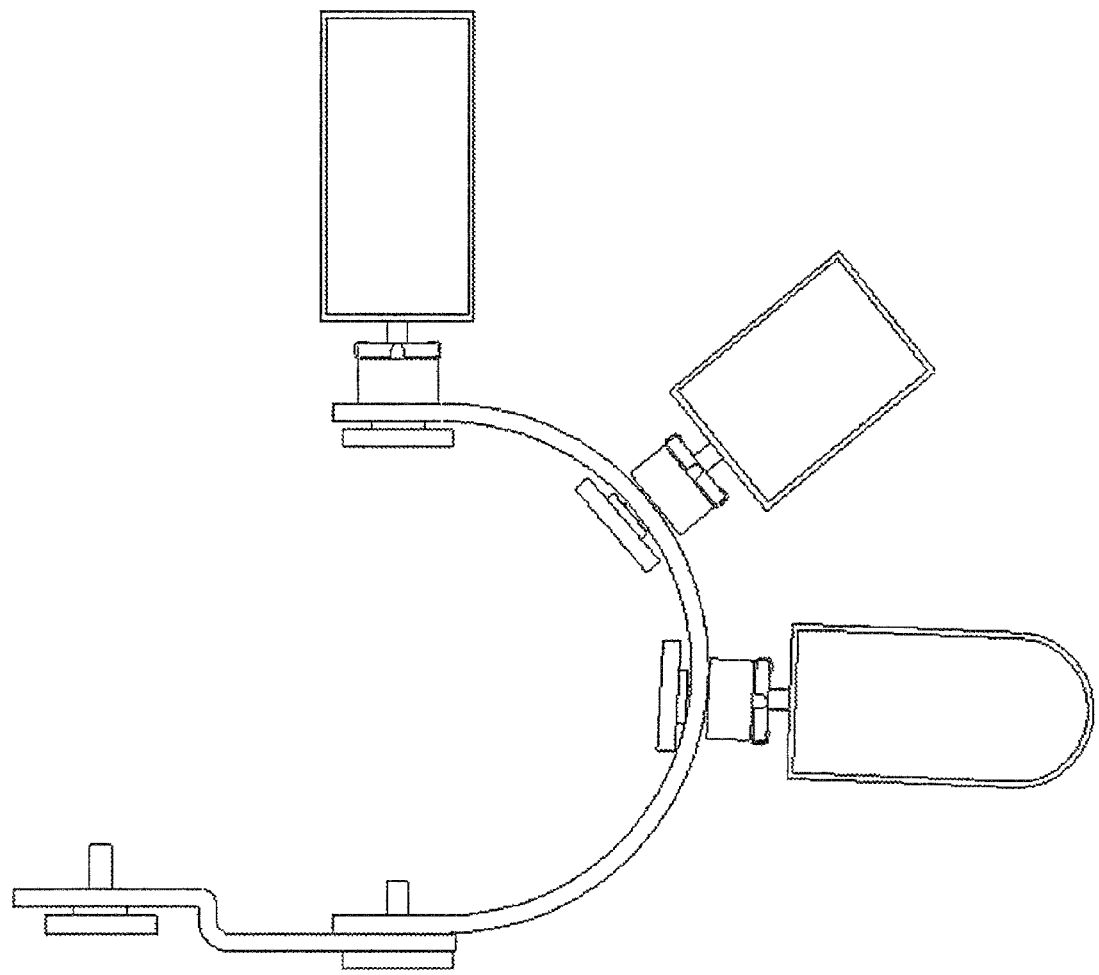
FIG. 4 is a schematic view of a working status according to the present invention when working together with a plurality of accessories.

An accessory connecting shelf for video and camera includes a horizontal orientated connecting plate having double-step connecting pieces. A screwed connecting through hole 3 for connecting a video and camera apparatus is provided in a higher connecting piece 2 at an inside end of the connecting plate. A chute 5 is provided on a lower connecting piece 4 at an outside end of the connecting plate. An arc support 6 is connected to the chute, and a lower end of the arc support 6 is connected with the lower connecting piece by means of a connecting screw 7 passing through the chute and a screwed through hole 8 at the lower end. An arc chute 9 is provided at an upper side of the arc support, and the arc chute is provided with hot shoe holders 10 for connecting accessories and locking screws 11 for fastening the hot shoe holders therein.

In usage, the higher connecting piece in the double-step connecting pieces is fastened with a video or camera apparatus by using a screw. Then, accessories for video and camera apparatuses, such as flash, video light, and microphone etc., are placed on the hot shoe holders. The locations of the accessories can be adjusted by adjusting the location and angles of the arc support and the locations of the hot shoe holders according to a shooting angle or the position of an object to be shot.

I claim:

1. An accessory connecting shelf for video and camera, comprising a horizontal orientated connecting plate having a double-step configuration having a higher and a lower connecting pieces that are substantially parallel to each other and extend horizontally in the same given direction, characterized in that: a screwed connecting through hole for connection of a video and camera apparatus is provided in the higher connecting piece at an inside end of the connecting plate, and a chute is provided at the lower connecting piece at an outside end of the connecting plate; an arc support is directly connected to the chute to be located on and slidable along a vertical plane coincident with the given direction, and a lower end of the arc support is connected with the lower connecting piece by means of a connecting screw passing through the chute and a screwed through hole at the lower end; an arc chute is provided at an upper side of the arc support, and hot shoe holders for connecting accessories and locking screws for fastening the hot shoe holders are provided within the arc chute.

* * * * *